(12) United States Patent
Cao

(10) Patent No.: US 7,483,894 B2
(45) Date of Patent: Jan. 27, 2009

(54) METHODS AND APPARATUS FOR ENTITY SEARCH

(75) Inventor: Yu Cao, Monterey Park, CA (US)

(73) Assignee: Platformation Technologies, Inc, Monterey Park, CA (US)

( * ) Notice: Subject to any disclaimer, the term of this patent is extended or adjusted under 35 U.S.C. 154(b) by 0 days.

(21) Appl. No.: 11/751,802

(22) Filed: May 22, 2007

(65) Prior Publication Data

US 2007/0288436 A1    Dec. 13, 2007

Related U.S. Application Data

(60) Provisional application No. 60/811,989, filed on Jun. 7, 2006.

(51) Int. Cl.
G06F 17/30 (2006.01)
G06F 7/00 (2006.01)

(52) U.S. Cl. .......................................................... 707/5

(58) Field of Classification Search ........................ None
See application file for complete search history.

(56) References Cited

U.S. PATENT DOCUMENTS

| | | | | |
|---|---|---|---|---|
| 5,559,714 A * | 9/1996 | Banks et al. | ................. | 700/233 |
| 5,632,007 A * | 5/1997 | Freeman | ....................... | 706/59 |
| 5,878,423 A * | 3/1999 | Anderson et al. | ............ | 707/100 |
| 6,078,916 A * | 6/2000 | Culliss | ........................... | 707/5 |
| 6,157,923 A * | 12/2000 | Iyler et al. | ...................... | 707/3 |
| 6,519,590 B1 * | 2/2003 | Reddy | ........................... | 707/5 |
| 7,013,290 B2 * | 3/2006 | Ananian | ........................ | 705/27 |
| 7,047,233 B1 * | 5/2006 | Humphreys et al. | ............. | 707/3 |
| 7,089,226 B1 * | 8/2006 | Dumais et al. | .................. | 707/3 |
| 7,181,438 B1 * | 2/2007 | Szabo | ............................ | 707/2 |
| 7,299,201 B2 * | 11/2007 | Jammes et al. | ................. | 705/26 |
| 7,346,603 B2 * | 3/2008 | Werner et al. | .................. | 707/2 |
| 7,346,608 B2 * | 3/2008 | Annau et al. | .................... | 707/3 |
| 2002/0073079 A1 * | 6/2002 | Terheggen | ....................... | 707/3 |
| 2002/0152200 A1 * | 10/2002 | Krichilsky et al. | .............. | 707/3 |

(Continued)

FOREIGN PATENT DOCUMENTS

WO    WO 2006133252 A2 *    12/2006

OTHER PUBLICATIONS

Anick, P.G. and S. Tipimeni "The Paraphrase Search Assistant: Terminological Feedback for Iterative Information Seeking", Proceedings of the 22nd International Conference on Research and Development in Information Retrieval (SIGIR 99), Aug. 15-19, 1999, pp. 153-161.*

(Continued)

Primary Examiner—Luke S Wassum
(74) Attorney, Agent, or Firm—Fish & Associates, PC

(57) ABSTRACT

Methods and apparatus that deliver a searching experience that is substantially akin to consultation with a human expert, and that satisfies a user's information need in fulfilling projects such as purchasing, shopping, procurement, bartering, requesting for quotes, in online retail, traditional retail, wholesale, health care, travel, real estate, restaurant-going, entertainment, logistics, and sourcing are disclosed. Search results often contain entities that provide services and products. Records being searched are associated with industry sectors in a broad sense. Industry sector information is first derived from a user query; and is used in determining relevant and adequate additional questions for a searcher, and in matching, ranking, and presenting search results.

20 Claims, 9 Drawing Sheets

U.S. PATENT DOCUMENTS

| | | | |
|---|---|---|---|
| 2005/0097092 A1* | 5/2005 | Annau et al. | 707/3 |
| 2005/0108200 A1* | 5/2005 | Meik et al. | 707/3 |
| 2005/0135264 A1* | 6/2005 | Popoff et al. | 370/252 |
| 2006/0053095 A1* | 3/2006 | Koch et al. | 707/3 |
| 2006/0149606 A1* | 7/2006 | Goan et al. | 705/7 |
| 2007/0016556 A1* | 1/2007 | Ann et al. | 707/3 |
| 2007/0112740 A1* | 5/2007 | Geva | 707/3 |
| 2007/0156677 A1* | 7/2007 | Szabo | 707/5 |
| 2007/0174244 A1* | 7/2007 | Jones | 707/3 |

OTHER PUBLICATIONS

Yoo, S.Y. and A. Hoffmann "A New Approach for Concept-Based Web Search", Proceedings of the 23rd SGAI Conference on Innovative Techniques and Applications of Artificial Intelligence (AI-2003), Dec. 15-17, 2003, pp. 65-76.*

Hoeber, O., X-D Yang and Y. Yao "Visualization Support for Interactive Query Refinement", Proceedings of the 2005 IEEE/WIC/ACM International Conference on Web Intelligence (WI '05), Sep. 19-22, 2005.*

Sybase "Sybase SQL Server™ Reference Manual, vol. 1: Commands, Functions and Topics", SQL Server Release 11.0.x, Document ID: 32401-01-1100-03, Jan. 24, 1996, pp. v-ix, 3-1 through 3-5, 3-300 through 3-312 and 3-352 through 3-358.*

Graupmann, J., M. Biwer, C. Zimmer, P. Zimmer, M. Bender, M. Theobald and G. Weikum "Compass: A Concept-Based Web Search Engine for HTML, XML and Deep Web Data", Proceedings of the 30th VLDB Conference, 2004, pp. 1313-1316.*

Graupmann, J., J. Cai and R. Schenkel "Automatic Query Refinement Using Mined Semantic Relations", Proceedings of the International Workshop on Challenges in Web Information Retrieval and Integration (WIRI), Apr. 8-9, 2005, pp. 205-213.*

* cited by examiner

An embodiment of a second or third query (original query, "DSC T50 $400"), (sector, "digital camera), (industry, "online retail"), (response 1, "black"), (response 2, "memory stick"), (derived 1, "low price"), (normalized query 1, "DSC-T50"), (normalized query 2, "below USD400"), (default_ranking, "by price"), (default_presentation, "list")

Figure 8

METHODS AND APPARATUS FOR ENTITY SEARCH

CROSS REFERENCE TO RELATED APPLICATIONS

This application claims priority to U.S. provisional application Ser. No. 60/811,989 filed Jun. 7, 2006.

FIELD OF THE INVENTION

The field of the invention is searching technologies.

BACKGROUND

Consider someone hunting for an apartment or a house, for a temporary relocation of 12 months. If she wants to use a corporate housing company, then querying "Oakwood corporate housing" or such on a typical search engine (Google™, Yahoo™ Search, MSN™ Search, Ask.com™) might well satisfy her information need. If, however, she wants to rent from other parties, and knows the location in question well enough, searching through Apartments.com's™ catalogue might suffice.

However, if she poses her information need as a query in a "conversational manner", such as "family of two kids, one dog, looking for an apartment or a house, commuting to West Los Angeles, good elementary schools, one year lease", then no available online tools can return helpful results to her.

The above example reveals that there is a lack of tools helpful to searchers in the common situation of fulfilling projects such as purchasing, shopping, procurement, bartering and requesting for quotes, in "industries" such as online retail, traditional retail, wholesale, health care, travel, real estate, restaurant-going, entertainment, logistics, and sourcing.

What is needed is a searching experience that is substantially similar to consultation with a human expert. A searcher with a project to accomplish would first find an expert in a given industry sector, and then pose her query. The expert in turn would ask additional questions and solicit response from the searcher. Then the expert typically gives the searcher a list of entities (e.g. providers of products or services) that are helpful in furthering her project.

Important ingredients to delivering such a searching experience include: (1) determining at least one "industry sector" from a user's query; (2) deriving needed additional questions, partially based on the derived industry sector information, and soliciting response from the user; (3) modifying the query into a second query which is formatted so that it facilitates searching (matching and ranking) and displaying search results.

The state of the art contains various elements that could be helpful, however, there is no known solution that contains all of the above ingredients. The state of the art is reviewed below.

(A) Determining an "Industry Sector" From a User Query

The term "industry" and "industry sector" (used exchangeably with "sector") are used in a broad sense. Within retail, an "industry" could be "electronics", a sector underneath could be "cameras", which in turn contains "film cameras" and "digital cameras".

When a user is settled on a service or product provider, her query might include the name of a service or product provider, as in "CVS in Santa Monica". Such a query is commonly submitted to "local search" engines, such as local-.Google.com. There are more prior art disclosures. For example, U.S. Patent Application, 20070016556 A1, Ann, et al., Jan. 18, 2007, teaches "receiving a query for a destination search, recognizing the industry type, the geographical name". This and all other extrinsic materials discussed herein are incorporated by reference in their entirety. Where a definition or use of a term in an incorporated reference is inconsistent or contrary to the definition of that term provided herein, the definition of that term provider herein applies and the definition of that term in the reference does not apply.

A user might alternatively be looking for a category of providers. For example, "drugstores in Santa Monica". This searching need has largely been solved by local search. There are more prior art disclosures. For example, U.S. Pat. No. 6,157,923, Ivler, et al., Dec. 5, 2000, discloses a method of processing a user query that includes "determining a first industry code based on the query"; and "displaying to the user information corresponding to the first industry code, in conjunction with information corresponding to at least one additional industry code which is not a subset or superset of the first industry code". The "industry code" in question is defined as the SIC codes. For another example, U.S. Patent Application 20060190439 A1, Chowdhury, et al. Aug. 24, 2006, discloses a method for classification of a query that includes "associating the category that is associated with the pattern also with the query phrase or the constituent part", and "identifying at least one search resource for satisfying the query phrase based on the associated category."

A user might alternatively form a query to describe a product or service of interest. For example, "SONY DSC-T50", which is a model name for a digital camera. To recognize such a proper name is also disclosed in prior art. For example, U.S. Patent Application, 20050222977 A1, Zhou, et al., Oct. 6, 2005, teaches "determining whether the entity name is associated with a common word or phrase", where "an 'entity,' as used herein, may refer to anything that can be tagged as being associated with certain documents. Examples of entities may include news sources, stores, such as online stores, product categories, brands or manufacturers, specific product models, condition (e.g., new, used, refurbished, etc.), authors, artists, people, places, and organizations."

A user query could be assigned a number of "categories" or "topics". U.S. Pat. No. 7,089,226, Dumais, et al., Aug. 8, 2006, teaches a method that "receives a query and processes probabilities associated with N categories that are collectively assigned a top-level classifier and individually assigned sublevel classifiers, each category having one or more topics, N being an integer".

However, there is the need for deriving industry sector information from a user query, which cannot be done by just extracting proper names. Such a query might not contain a proper name, or the connection between a proper name to an industry sector is not straightforward. For example, the query "Christmas gifts to 8-11 year olds" can reasonably yield industry sectors such as "toys", "games", "clothes", "books", defying a simple mapping from the proper name "Christmas" to these industry sectors.

(B) There is the Need for Asking Additional Questions

Often times, after an initial query, additional questions are needed to direct to a searcher. For example, in purchasing, specifications of a product are highly relevant to a purchasing decision, but many times such specifications are not included in the searcher's initial query, for at least two reasons, one, the searcher might not be aware of, or do not know how to ask about, the specifications (e.g., what is the most number of ports a USB port can have); and two, the initial query would be too complicated if it includes many specifications.

Online tools devoted to a particular topic solicit response from searchers. For example, Blue Nile (bluenile.com) has a "Refine Your Search Criteria" feature that solicits feedback from searchers on six specifications: "Shape", "Carat", "Cut", "Color", "Clarity" and "Price". By clicking on a box or sliding a scale, a searcher provides feedback which leads to changes in search results. These six specifications are highly relevant to satisfying the searcher's information need, and a human expert would have asked a searcher about them, too.

Many database applications provide users with a list of additional questions, typically in the form of menu choices, once an "industry" is known. For example, U.S. Patent Application, 20020152200 A1, Krichilsky, et al., Oct. 17, 2002, teaches a product searching method that comprises "a step of receiving an industry selection", "receiving an application selection", "receiving a filter selection", and "then receiving a search-property selection".

There is also prior art in providing "related searches", such as the "Narrow Your Search" and "Expand Your Search" features by Ask.com™. However, such related searches typically are entirely based on the user query.

What is needed includes (a) dynamically determining additional questions to be asked, partially dependent on both the initial user query and the derived industry sector information; (b) whenever it is possible, the questions are also "adequate", in that they are sufficient in serving the user's information need. These two needs are many times addressed when a searcher consults with a human expert.

(C) There is the Need for Query Rewriting

It is common that exact matching the entirety or part of a user query yields no search results or few. There is a need, therefore, to rewrite the query so that enough relevant search results could be found. But the state-of-the art addresses generality, and cannot serve the need, some of which are reviewed below.

U.S. Pat. No. 6,006,225, Bowman, et al., Dec. 21, 1999, teaches that "using at least the query term correlation data to identify a plurality of additional query terms that are deemed to be related to the at least one query term". The method utilizes a "related terms list" mapping a term to a number of other terms, where "each term that appears within the related terms list" is "deemed to be related to the corresponding key term" "by virtue of the relatively high frequency with which the terms have occurred within the same query".

U.S. Patent Application, 20060206474 A1, Kapur, et al., Sep. 14, 2006, teaches that in matching a query against text of sponsored ads, "modifying the query to produce a modified query using rules designed to increase a chance that the modified query matches more predefined query strings."

U.S. Patent Application, 20060167842 A1, Watson, Jul. 27, 2006, teaches finding "at least one alternative query if the initial search results are deemed inadequate by the result evaluation mechanism", and such an alternative query typically is "a sub-query of the original query, with synonyms and thesaurus considered". The following example is given: for the the input query "blue mini ipod", two alternative queries are presented to the searcher: "blue ipod" and "Mini Ipod".

What is needed is powerful query rewriting that goes beyond generality or linguistic transformations, or co-occurrence frequencies.

(D) The Overall Need

Overall, what is needed methods and systems that emulate interactions with an industry expert, so as to offer searching experience that is substantially similar to a searcher's consulting with to an expert in an area of interest, and getting back results that are helpful in the searcher's decision making. Some of the desirable features are listed below.

(I) A human expert would be able to derive industry sector information derivable from a searcher's query. The methods and systems should do so.

(II) A human expert would ask the searcher relevant and adequate additional questions, based both on the derived industry sector information and the user query, and further based on the perspective of the searcher. For example, with the user perspective of purchasing, an expert would guide buyers of goods and services past all the irrelevant information, and focus on the features that distinguish one vendor from the next. Where the buyer is not aware of a particular feature or parameter of interest, the expert would ask relevant questions. The expert would also guide users to consider related products and services that they may have ignored. The methods and systems should do so.

(III) An expert would get feedback from a searcher, re-organize and paraphrase with industry knowledge and jargon so as to be conductive to industry-specific searching for information. Once matching information is found, the expert would give recommendations in rank order. Such recommendations are based upon extensive industry knowledge. In the context of purchasing services or products, the expert would factor in which companies are the most reputable, cost-effective, reliable, and so forth. The methods and systems should do so.

The searching experience typically is multi-cycled, and the query-search and question-response iterations are not unlike a question and answer session a searcher would have with an expert.

SUMMARY OF THE INVENTION

Aspects of the current invention delivers a searching experience that is substantially akin to consultation with a human expert, and that satisfies a user's information need in fulfilling projects such as purchasing, shopping, procurement, bartering, requesting for quotes, in "industries" such as online retail, traditional retail, wholesale, health care, travel, real estate, restaurant-going, entertainment, logistics, and sourcing. Of particular interest are searching for electronics, and other consumer goods that one might choose to purchase from, or at least investigate using, the Internet.

With a preferred embodiment of the current invention, a search system receives a query, typically in natural language, from a searcher. From the user query, "industry sector" information is first derived. (The term "industry" and "sector" each is used in a broad sense, for example, an industry can be "addresses", containing two sectors, "mailing addresses" and "physical addresses".) The user query and the derived information sector information are used in determining additional information needed to be solicited from the searcher. The system displays the information and obtains responses from the searcher. The initial user query, the derived industry sector information, and the response from the searcher, are used in deriving a second query, or sometimes third or more queries, which in turn is used in searching records on the system and displaying search results.

On the system, a record is associated with at least one industry sector. Some of the records on the system correspond to entities, business or otherwise. An entity typically is an actor such as service providers, sellers of goods, wholesalers, manufacturers, consultants, agents, among others. Many times such entities are what the searcher is looking for in search results, while other times products and services are what the searcher is looking for.

Derivation of industry sector information is a key to successfully serving the user's information need. Industry sector information is first derived from the user query, which is a key to determining needed additional information whose purpose is to be relevant and adequate in serving the user's information need. Further, in matching and ranking, industry sector information is among the important factors. Finally, in presentation, industry sector information guides the choosing of display formats.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWINGS

FIG. 8 is a schematic depicting an embodiment of a second query.

DETAILED DESCRIPTION

Figure 1:
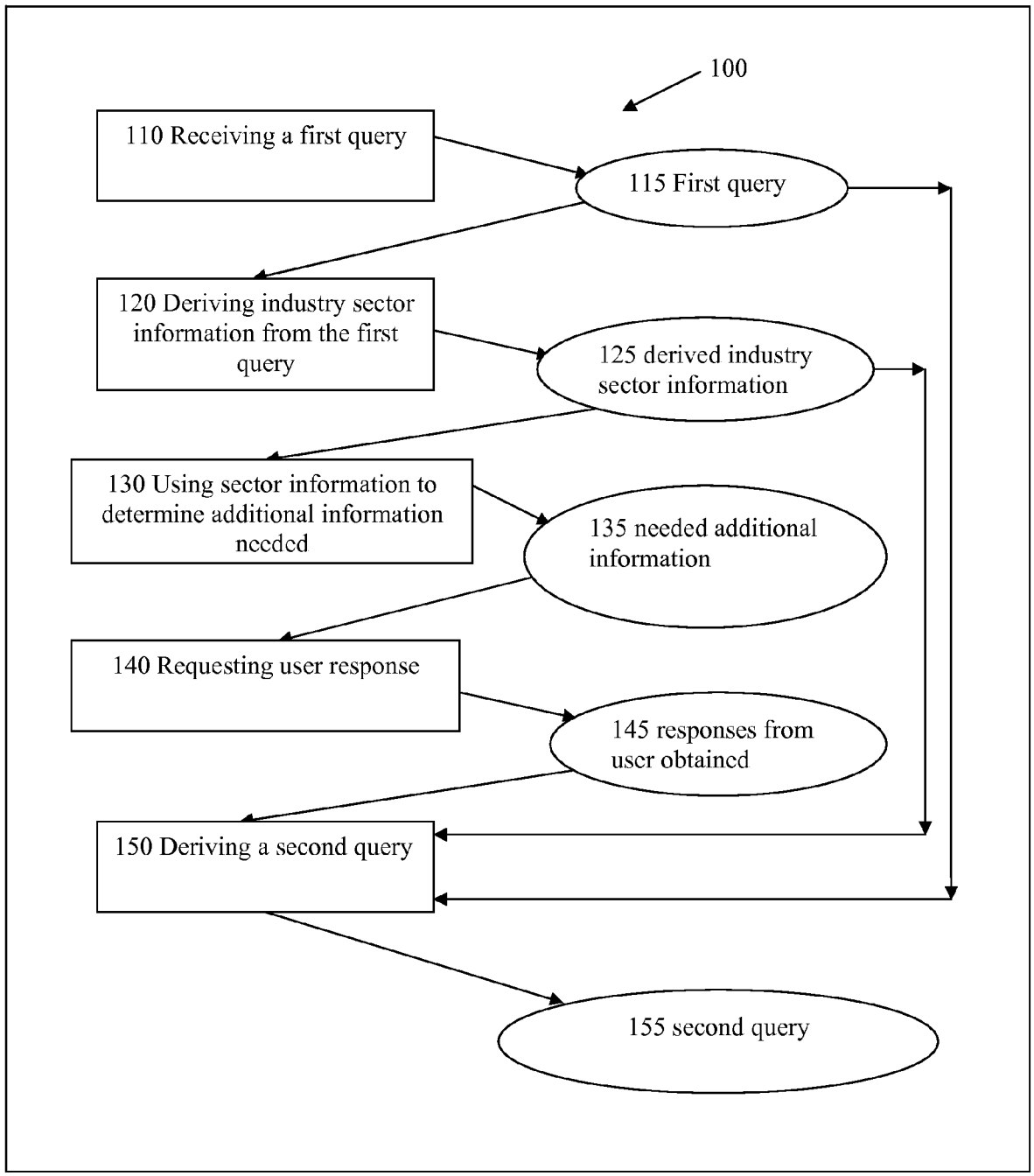
FIG. 1 is a schematic depicting the general flow of a preferred method of searching records.

In FIG. 1 a method 100 of searching for records generally includes the following steps: receiving 110 a first query 115; deriving 120 industry sector information 125 from the first query 115; using 130 the derived sector information 125 to determine additional information needed 135, requesting 140 responses 145; and deriving 150 a second query 155 from at least a portion of the first query 115 and at least a portion of the response 145.

Receiving a first query 110 can be accomplished in any suitable manner. In many instances the query will be constructed in a live interaction by a human user, but could conceivably be created with minimal or no human direction. In many instances the query will also be transmitted to a search engine/system on an ad hoc, individual basis, but could also be stored and transmitted in batch form. Contemplated queries can be of "natural language queries", can any suitable length, although queries will typically have a length between one and ten words; they can be in any languages. The user could also search other than text, e.g. audio/video clips, image patterns (speckled red). Additionally, information extrinsic to the query, such as time of the query, discerned geographic location of where the query originates, information that leads to partial or complete identification of the user, is also received along with the query.

In step 120, it is contemplated that whatever system is conducting the method 100, splits the world up into multiple segments. Segments could, but typically would not overlap. Each segment is transformed into a format that facilitates deriving of industry sector information. Each transformed segment is derived industry sector. The industry sectors are preferably sub-classifications within industries, such as sectors characterized by SIC codes. On the other hand, sectors could be high or low levels of abstraction, e.g. cars vs private transportation means. Sector divisions need not be tautological. The term "industry" and "sector" are used in a broad sense, for example, "addresses" could be an "industry" that contains two sectors: "physical addresses" and "mailing addresses". The derived industry sectors are consolidated so that there is no redundancy, and normalized so that there is no ambiguity in matching.

In this context the terms "derivating" and "deriving" are used broadly to include any derivational method, whether entirely by machine, entirely by human, or any combination of these, and can have any degree of determinism. In extreme cases derivations could be identical to the first query, or could include no terms at all that are in first query. Most likely, however, derivations would include one or more keywords or other subsets of the first query, and some extrinsic information such as location, time of day, user profile, and so forth. As long as a first string is used in some manner to create or produce the second string, then the second string is considered to be a derivative of the first string. It is also contemplated that a confidence measure could be attached to the derivation. The term "deriving" also include default-based derivations. Additional information on deriving is set forth in the discussion below with respect to FIG. 3.

In step 130, sector information is used to determine additional information that could be helpful in performing a search. Both the derived industry sector information and the first query are used in this step. The "additional information" is relevant to the industry sector, and with the current invention, often "adequate" in that it is sufficient in serving the user's information need. The additional information, some of which are in the form of questions, is generally of three kinds: (1) for disambiguation; (2) for narrowing the search; and (3) for broadening the search. Information for disambiguation might be helpful in correcting misspellings; or in clarifying words (or phrases, acronyms, abbreviations or others) of multiple meanings (e.g., "LA" could be Los Angeles, Louisiana, among other things; "Washington" could be the city or the state). Information for narrowing the search helps to derive sectors of lowest abstraction, and help to fill in specifications of a product or service. Information for broaden the search helps to ask the user about related services, products, sectors that are deemed helpful in serving the user's information need.

In this context, the term "determining" is used broadly in a similar manner as the "deriving" step 120. Additional information on determining is set forth in the discussion below with respect to FIG. 5.

Once additional information (some of which are questions) is determined, it is presented to a user in various forms, setting the stage for step 140 of requesting user's responses. Various presentations of the questions to the user is contemplated, including multiple choices, pull down menus, hyper links, radio buttons, forms, sliding scales, color maps, 2 dimensional grids, symbols (e.g., emoticons, smileys). The user is expected to respond by clicking or by typing in text. Additional information on requesting user's response is set forth in the discussion below with respect to FIG. 6.

In step 150, a second query is derived from at least a portion of the first query and at least a portion of user's responses. The derived industry sector information is also typically used.

The second query serves the purpose of facilitating retrieving records, ranking search results and presenting them. A second query could have multiple sections, each of which is a well formed query. A section is preferably parameterized, preferably by pairs of (attribute, value). Attributes are agreeable by the retrieving, ranking and presentation methods. Some attributes help to direct retrieving, for example, searching only information in certain industry sectors, or employing stemming in matching; other attributes help to direct ranking, for example, tie-breaking mechanisms, ranking preferences in geographic locations, etc; still other attributes describe relationship between sections, for example, ordering of sections. Additional information on a preferred embodiment of the second query is set forth the discussion below with respect to FIG. 8.

Deriving the second query share all the essence of deriving industry sector information discussed above. Deriving the second query also uses templates, patterns, rules that are at least partially dependent on industry sector information. Additional information on this step is set forth in the discussion below with respect to FIG. 7.

Figure 2:
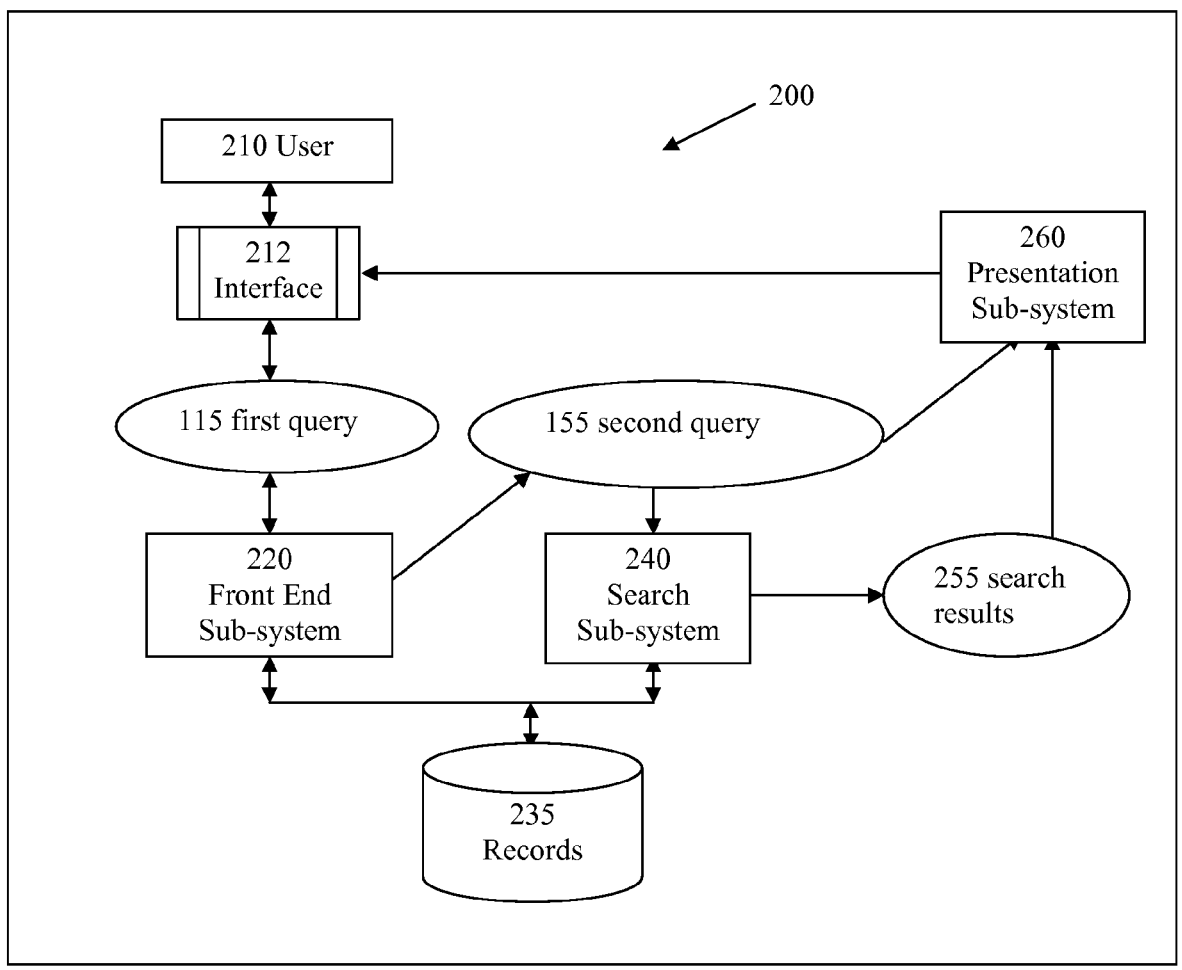
FIG. 2 is a schematic depicting a searcher's interaction with the search system of FIG. 1.

FIG. 2 depicts components of a search system 200, a preferred embodiment. A user 210 submits a first query 115 through the Interface 212. The Front End Sub-system 220 takes up the query, interacts with user, and eventually derives a second query 155. The second query is provided with the Search Sub-system 240, which searches Records 235, does matching and ranking among other things, and creates search results 255. The search results are provided with the Presentation Sub-system 260, which is also provided with the second query. The Presentation Sub-system 260 presents the search results to the user.

The preferred embodiment substantially resembles a search engine (e.g., Google™). However, it is contemplated that the user interface 212 could be a cell phone, a PDA, a (traditional) telephone. Records 235 include both information to be searched, and information that is supportive to searching. The information to be searched includes that on industries, sectors, products, services, entities (e.g., providers of products, providers of services). The supportive information includes (i) that is related to industries and sectors, (ii) that on relationship among industries, sectors, entities, products and services, that on users to the extent they can be profiled, (iii) that on common knowledge such as places, people, geography, languages, (iv) that is unique to the search system, including interactions between searchers and the search system (e.g., query logs, clicking activities), (v) that is a result of after certain internal processings, which is suitable to be used by the search sub-system 240; such information includes inverted index of various forms, forward index.

The search sub-system 240 employs all suitable algorithms include exact matching, non-exact matching, proximity search, cache lookup. Search results 255 is formatted by the presentation sub-system 260, which displays search results as text, image, animation, audio, and video on suitable display areas such as a web page which could be divided into at least two areas, horizontally or vertically or a combination.

Figure 3:
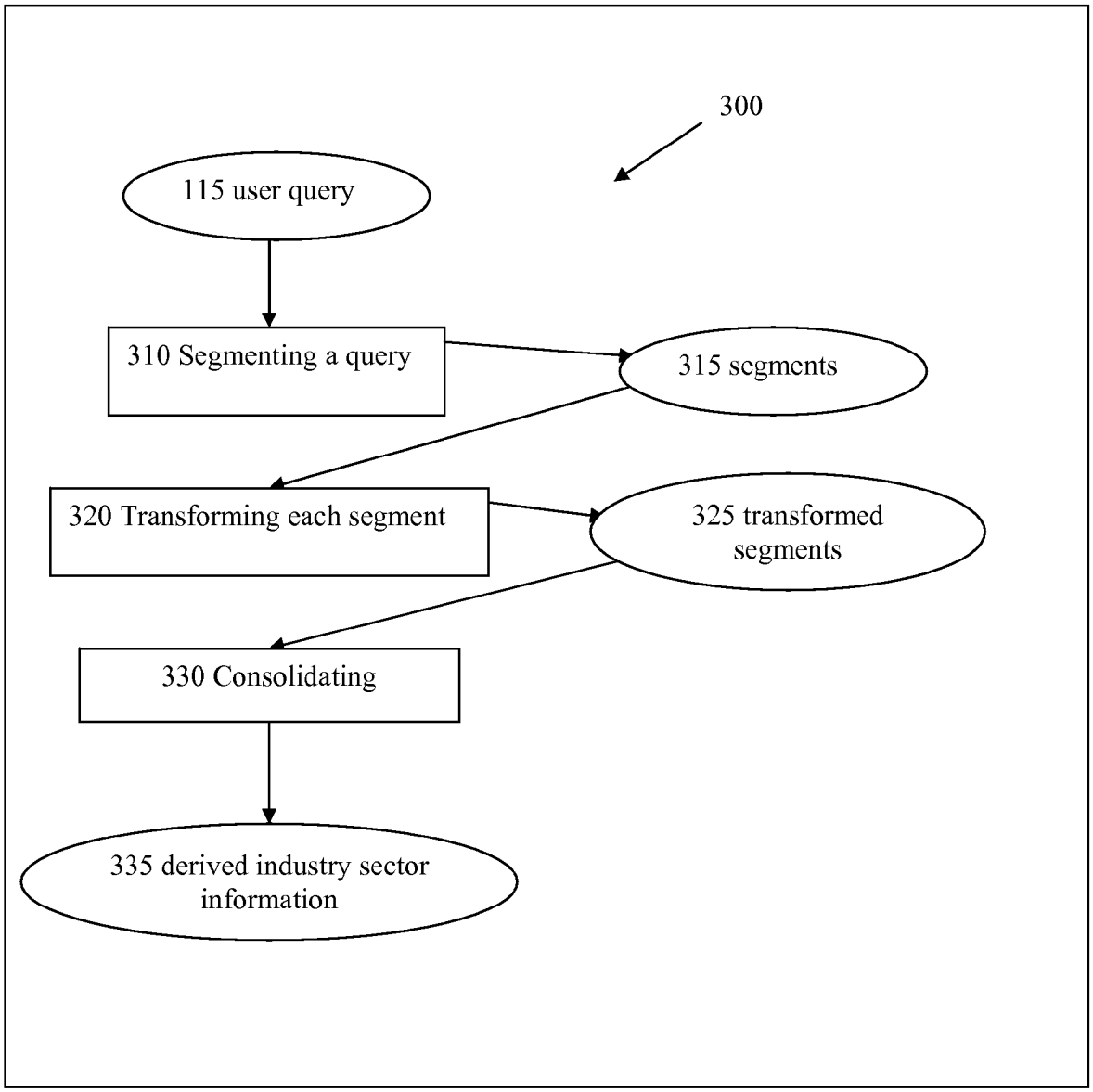
FIG. 3 is a schematic depicting further detail of the step of deriving industry sector information.

FIG. 3 depicts methods in deriving industry sector information from a query. A query typically is in natural language, for example, in the industry of retail, a query could be "buying SONY Cyber-Shot DSC-T50 under $400". It is also contemplated that a query could be a form consisting of multiple fields to be filled out, either by clicking on choices, or by typing in text.

This step applies general knowledge and specific sector knowledge, divides a user query into segments, recognizes each segment as belonging to a type, and applies rules to the segments individually and collectively. In general, the principle of finding the "lowest possible sector" applied, for example, given a query "SONY DSC-T50", the preferred method yields the sector "DSC-T50", in addition to the sector "SONY".

The final result of step 300 is the derived industry sector information 335. Derived industry sector information includes at least one industry and one sector. Some possible industries are listed as follows: online retail, traditional retail, wholesale, health care, travel, real estate, restaurant-going, entertainment, logistics, and sourcing. The term "industry" and "sector" each is used in a broad sense, for example, an industry can be "addresses", and contain two sectors, "mailing addresses" and "physical addresses". All manner of industries dealing with consumer goods are especially contemplated.

Figure 4:
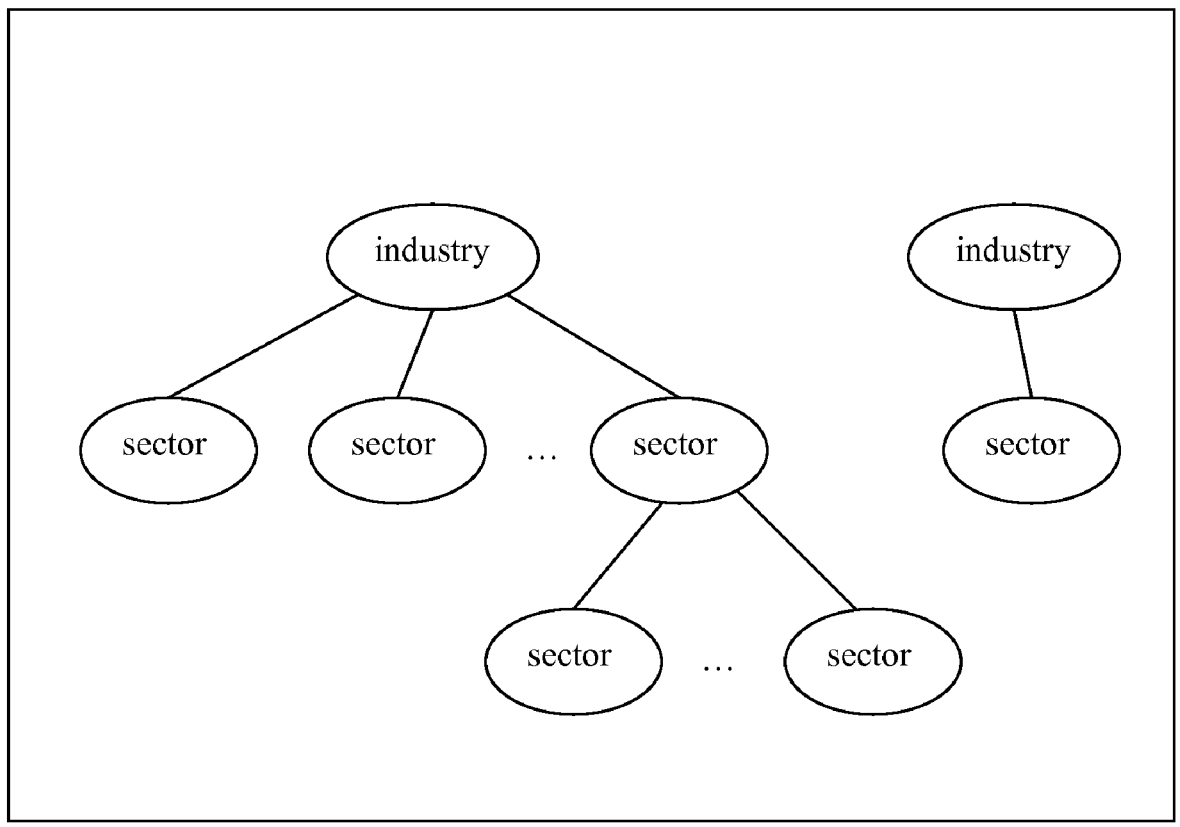
FIG. 4 is a schematic depicting possible relationships among multiple industries and sectors within those industries

A sector typically belongs to an industry, or to another sector. The industry-sector, and sector-sector relationship can typically be represented by a tree, as depicted in FIG. 4. For example, one branch of such a tree could have the following nodes: Node 1, "online retail", an industry; Node 2, "electronics", a sector, being a child of Node 1; Node 3, "digital cameras", a sector, being a child of Node 2; Node 4, "digital cameras under $600", a sector, being a child of Node 3. Another branch of the same tree could have the following nodes: Node 1, "online retail", an industry; Node 2, "electronics", a sector, being a child of Node 1; Node 3b, "film cameras", a sector, being a child of Node 2; Node 4b, "film cameras under $600", a sector, being a child of Node 3b.

Representations other than tree are also contemplated, including: (1) lookup tables, which are suitable for industry-sector relationships; (2) graphs, which are suitable for cases where a sector belongs to multiple sectors, or a sector belongs to multiple industries.

Contents of these industries and sectors are first created with a combination of soliciting knowledge from human experts, and studying existing classifications, such as public domain knowledge the Standard Industry Codes (SIC™ codes), the North America Industry Classification System (NAICS™), and the United Nations Standard Products and Services Code®) (UNSPSC®), the Open Directory Project™ (dmoz.com), Wikipedia™, Citizendium™, as well as well-known knowledge such as classifications used by SuperPages.com™, and Thomas Register™, or product catalogues by Macy's™. Classifications in countries other than the US are considered, also.

Contents of these industries and sectors are further modified with software. All suitable algorithms are contemplated, including but not limited to clustering, classification, Bayesian Networks, and text mining.

In FIG. 3, three general steps are depicted in deriving industry sector information from a user query. It first segments the query into one or more pieces of information, each of which is recognized as belong to a type. For example, in the context of logistics and transportation, a type could be cargo, service, location, or route. A recognized segment is normalized so that equivalent information is mapped into one internal form. Normalization applies to jargon, abbreviations and acronyms, among others. For each recognized segment, certain rules are applied so as to deduct further knowledge. For example, if a recognized segment is the city of Los Angeles, then after rules are applied, the city of Los Angeles is associated with the Port of Los Angeles, the Port of Long Beach, LAX, Southern California, among others. If there are multiple recognized segments, another set of rules are applied to the relationship among the segments so that more knowledge is deducted. For example, given two segments: LAX (the airport code of the Los Angeles World Airport), and JFK (the airport code of one of New York City's airports), then by rules in logistics and transportation, the knowledge can be deducted that many companies provide air express services between LAX and JFK. For another example, give LAX and PVG (an airport in Shanghai), after rules are applied, it is known that custom clearance might be a relevant industry sector since the two airports are in different countries. The recognized segments, the unrecognized portion of the user query, and knowledge deducted, are all utilized in further steps. The result could be of more than one industry sector, (e.g., a second industry sector).

With step 310, a user query is segmented. Typically segments 315 do not overlap but they could. Step 310 includes extracting "common" proper names; such proper names include but are not limited to holidays, businesses, places, people's names, general merchandises, commonly used industry names, commonly used product names, commonly used service names, time and dates, numbers, measures, currencies. A proper name is mapped to a set of plausible industries. For example, a query "Easter gifts for children" could yield the set {"toys", "decorations"}. All suitable algorithms are contemplated, including but not limited to lookup tables, uni-grams, bi-grams, n-grams.

Step 310 further includes extracting proper names specific to a certain industry or a sector. Such proper names include but are not limited to acronyms, abbreviations, product models, jargon, and terminologies. A preferred embodiment is as follows: given a set of industries, for each industry, look up a table of proper names for their occurrences in the query. For example, with the industry "electronics", the proper name "Cyber-shot" is included in a lookup table specific to the industry "electronics", and it is found in the query "buying SONY Cyber-Shot DSC-T50 under $400". All suitable algorithms are contemplated, including but not limited to lookup tables, stemming, and non-exact matching.

Step 320 transforms each segment in order to prepare them for further steps. One aspect of the transformation is normalization of a word (or a phrase, an acronym, an abbreviation, etc.) so that it can be effectively mapped to a known equivalent concept. For example, "DSC T50", "DSC-T50", "SONY digital camera T50" could all be mapped to a normalized version of the concept "SONY digital camera, model DSC-T50". Another aspect of transformation is derivation of knowledge about a segment. For example, given the normalized segment "DSC T50", such knowledge as "retail", "electronics", "camera", "medium- to high-end purchase" could all be derived.

With step 330, transformed segments 325 are consolidated. Knowledge is applied to derived segments such as proper names, industries, and sectors, to further derive industry sectors. Some contemplated methods are listed below:

(1) With a preferred embodiment, associatively related terms, not just definitionally related terms, are used in further deriving. For example, for the query "wooden elephant", by applying definitional knowledge, a derived sector might well be "wooden mammal", because definitionally an elephant is a mammal; by applying associative knowledge, however, a derived sector could be "African crafts", because associatively a piece of elephant craft could be from Africa.

(2) Relationship among derived items. When there are more than one derived item, a known relationship could be applied in further deriving. For example, "metal sheets from Mexico to China". With a preferred method, the sector "Mexico" and the sector "China" are derived, followed by applying transportation knowledge, which might yield another sector, "custom clearance", because transportation knowledge indicates that "Mexico" and "China" are two different countries, thus custom clearances are involved.

Figure 5:
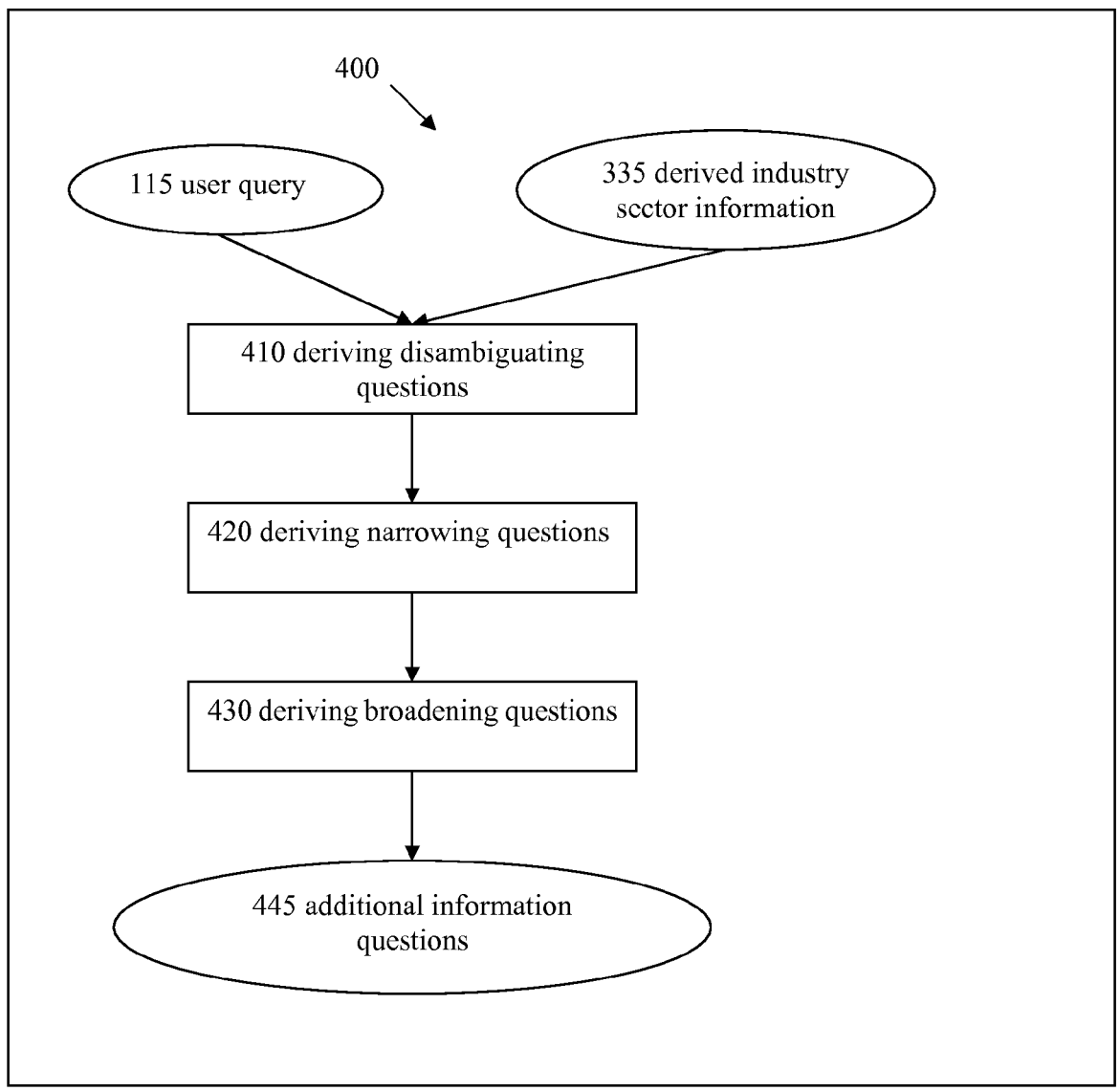
FIG. 5 is a schematic depicting the general flow of the step of determining additional questions needed.

FIG. 5 depicts step 400 of determining needed additional information, which is used in soliciting responses from the user. Input to this step includes the first query 115 and the derived industry sector information 335. The final output is Additional Information Questions 445. Some of the information is in the form of questions. The needed additional information serves different purposes, some of which are listed below.

(1) Some of the needed additional information is of disambiguating nature. There are words, phrases, acronyms, abbreviations that are by nature ambiguous. For example, "LA" could be the city "Los Angeles" or the state "Louisiana". There are also those that are ambiguous within a given industry or a sector. For example, there are a number of movies with the title "Marie Antoinette".

(2) Some of the needed additional information is of a specificational nature. Such information helps to narrow down user's intentions. For example, with a user query "DSC-T50" and the derived sector "digital cameras", a piece of additional information of specificational nature could be "between $250 to $299?" or "between $300-$350?" For another example, with a query and the derived sector "books", a piece of additional information could be "in which language?" For still another example, given a user query and its derived industry sector information, a Request for Quotes (RFQ) can be used as additional questions, which is created partially dependent on the first query and the derived industry sector information by some of the contemplated steps as follows: (i) selecting a most appropriate Request for Quote (RFQ) from a number of candidate RFQs; (ii) selecting the fields of the RFQ to use, and (iii) further creating on-the-fly additional fields.

(3) Some of the needed additional information is of an associative nature. For example, with a user query "DSC-T50" and the derived sector "digital cameras", a piece of additional information of associative nature could be "memory sticks", or "tripods".

(4) Some additional questions are directed to what types of information the user is most interested in searching for. For one example, questions asking the user whether or what kind of advertisements she is willing to see.

(5) Some of the additional questions are directed to presentation of search results. For example, in what language(s) records (including advertisements) should be presented to the user.

(6) Some of these additional questions are directed to the searcher's perspective. A searcher looks for information in order to fulfill a given project such as purchasing, shopping, procurement, bartering, requesting for quotes. Different perspectives can readily lead to different needed additional questions. For example, for the perspective of shopping, additional questions on product specification is highly relevant and should be directed to the user. For another example, for the perspective of procurement for a company, contractual terms are highly relevant questions.

In all of steps 410, 420 and 430, industry-specific knowledge is applied. Knowledge specific to an industry includes but is not limited to (1) sectors belonging to the industry; (2) industries that are most similar to the industry; (3) known user activities associated with the industry. For example, in the context of search, such user activities include the number of queries that are relevant to the industry, and the number of clicks on search results for such queries. Thus, for example, it is expressly contemplated that at least some of the additional information could have particular significance for the industry sector, and for an industry that includes the industry sector.

In all of steps 410, 420, 430, sector-specific knowledge is applied. In general there could be more than one sector. Knowledge specific to a sector includes but is not limited to (1) the industry, or industries, to which the sector belongs; (2)

sectors belonging to the sector; (2) sectors that are most similar to the sector; (3) searcher activities associated with the sector, for example, the number of queries that are relevant to the industry, and the number of clicks on search results for such queries.

Figure 6:
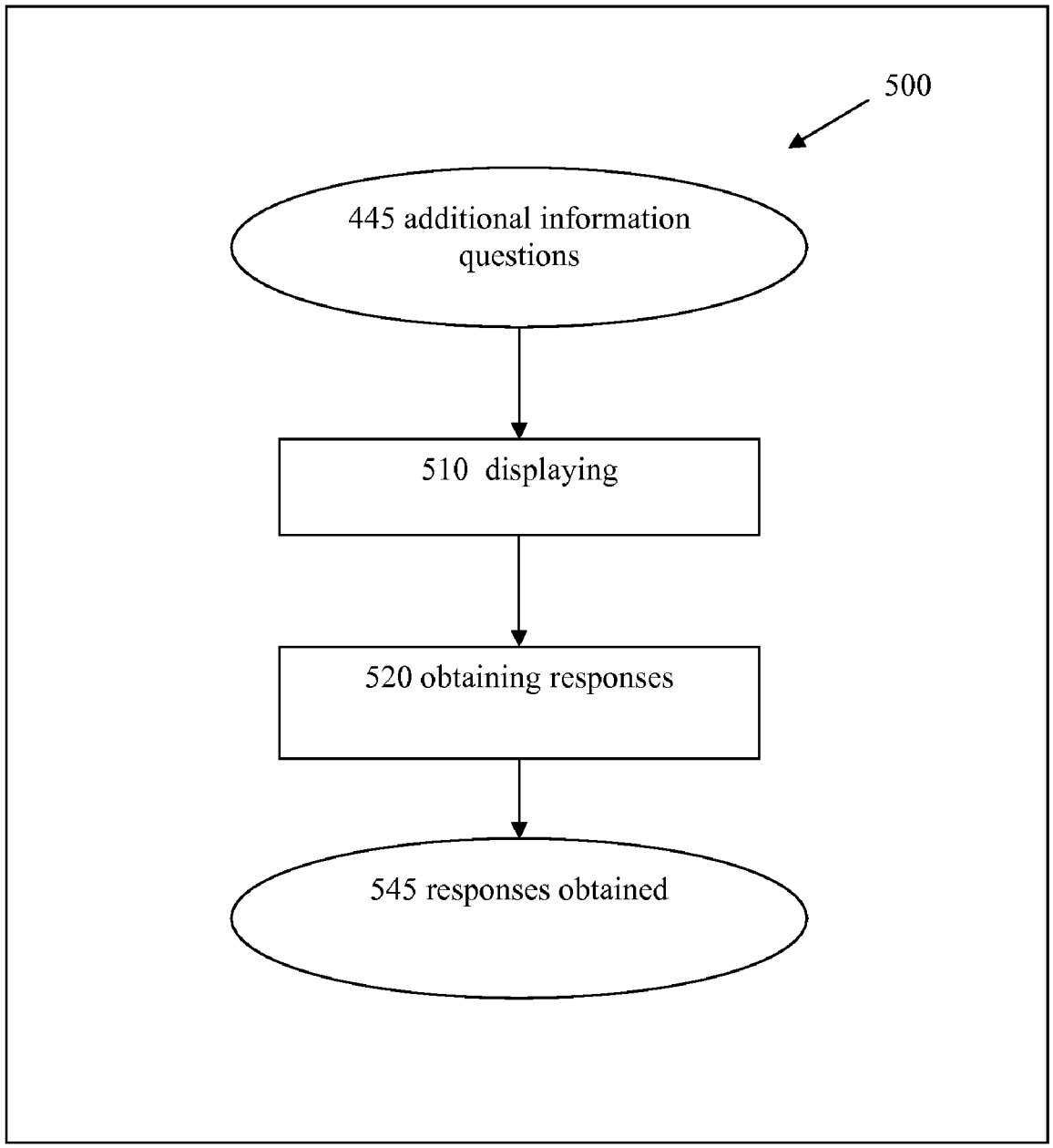
FIG. 6 is a schematic depicting steps in requesting additional information from the searcher.

FIG. 6 depicts step 500 of obtaining responses from a user. The Additional Information Questions 445 is first displayed to the user, and responses are solicited. The obtained responses are stored in an internal format that facilitates further processing.

In step 510, all suitable forms for displaying the information are contemplated, including but not limited to multiple choices, clickable links, popup windows, pull down menus, forms with fields to fill out, symbols such as emoticons and smileys, sliding scales. Two-dimensional displays are also contemplated, such as grids, and tables.

In step 520, user responses are solicited. A user might be asked to type in information, typically in a text box, or more generally a form consisting of fields to be filled out. The user could also respond without typing, by clicking on multiple choices, hyperlinks, sliding scales, or others.

With one embodiment, several web pages are presented in sequence, each displaying information or soliciting responses. With another embodiment, it is contemplated to employ images of distorted letters and numbers to guard against software-created clicks.

Figure 7:
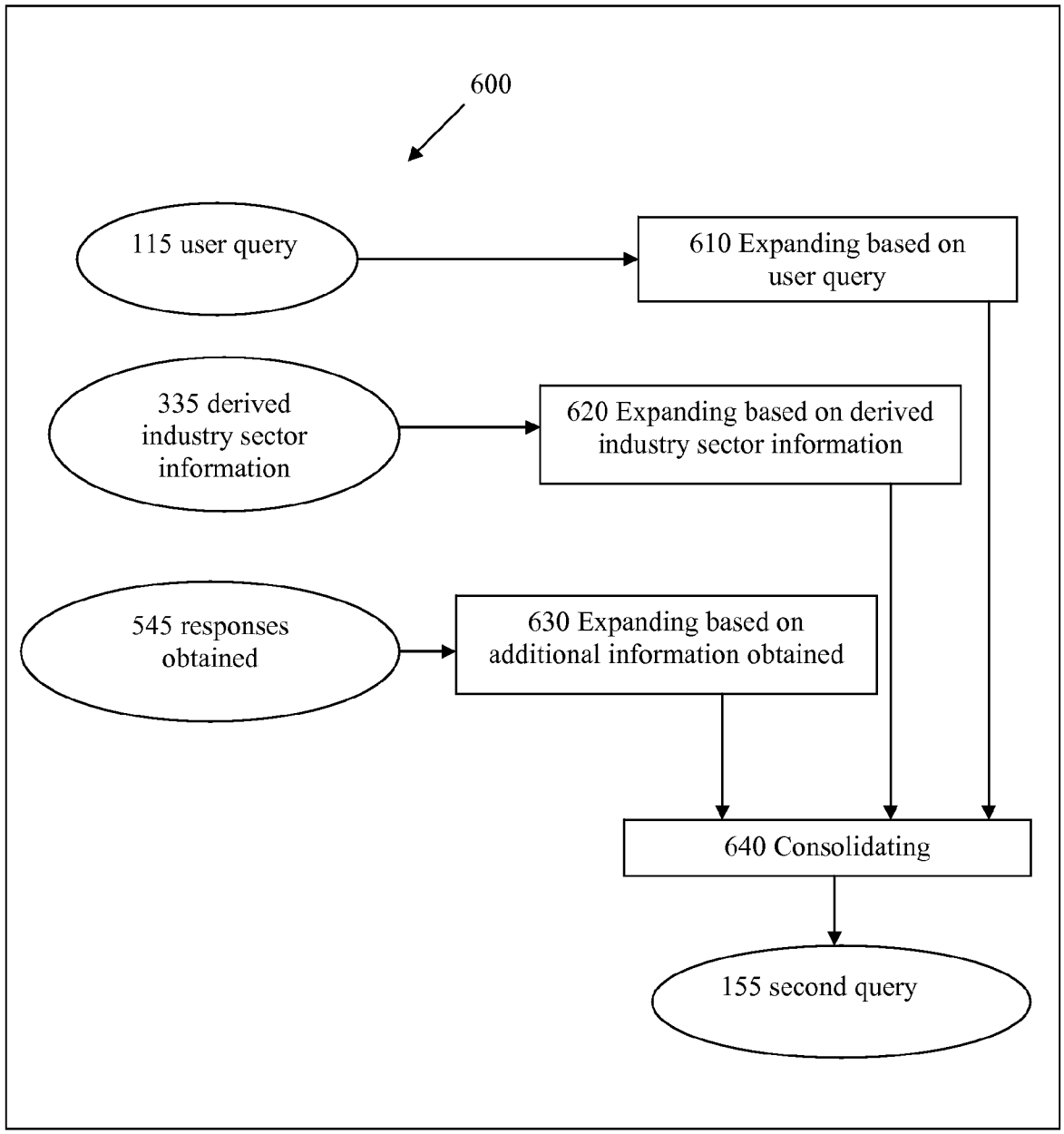
FIG. 7 is a schematic depicting the step of deriving a second query.

FIG. 7 depicts step 600 of deriving a second query. Input to this step includes all information that has been provided by the user, as well as all information that has been derived.

An embodiment of a second query is depicted in FIG. 8. A second query typically has multiple sections, each of which is a well-formed query. A section is preferably parameterized, preferably by pairs of (attribute, value). Attributes could be iteratively and hierarchically arranged, forming preferably a tree structure. Attributes help to direct retrieving, ranking, and finally presentation. Permitted values for an attribute is dependent on the attribute, and could have the format of text string, number, currency, date, and logic values. Attributes can be of following several types:

(1) those stipulating what subsets of Records 235 to search in, for example, which industry sectors, or what date ranges, or what geographic locations, or what price ranges;

(2) directives in matching methods, such as matching with stemming, exact matching, matching by the normalized form of a word (or a phrase, an acronym, an abbreviation, etc.);

(3) directives in ranking, such as ranking preferences ("rank by geographic location first, then by price"), and tie-breaking mechanisms;

(4) describing relationships among sections, such as precedence of sections, and logic relationships (AND, OR, NOT);

(5) expressing confidence measures, such as user expressed desirability of a search result ("must-have", "might-have"); and (6) directives in presentation of search results, including formatting, fonts, color, etc.

Throughout step 600, normalization and parameterization is done. Normalization maps a word or a phrase into a standard form. For example, "UCLA", "University of California at Los Angeles", "University of California, Los Angeles", "ucla", could all be normalized into a standard form such as "_school_university_of_california_at_los_angeles".
Parameterization maps a word or a phrase into at least one pair of (attribute, value). For example, "Los Angeles" could be parameterized into the pair ("city", "los angeles").

Three general steps are included in this step. In implementation, the order of the steps might change, and there might be more than one iteration.

With step 610, deriving is done based on the user query. The main work is normalization and parameterization of words and phrases found in the user query.

With step 620, deriving is done based on the derived industry sector. In addition to normalization and parameterization, industry-specific and sector-specific additions and modifications are done. For example, with the derived sector "digital camera", and the phrase "under $100" contained in the user query, the second query might include "low priced".

With step 630, deriving is done based on additional information obtained from the user. In addition to normalization and parameterization, additional information is used in filling in details in narrowing a search, and in creating related queries.

With step 640, results from the above steps are consolidated. This step does at least the following: (1) removal of duplicates; (2) modification; and (3) addition.

Figure 9:
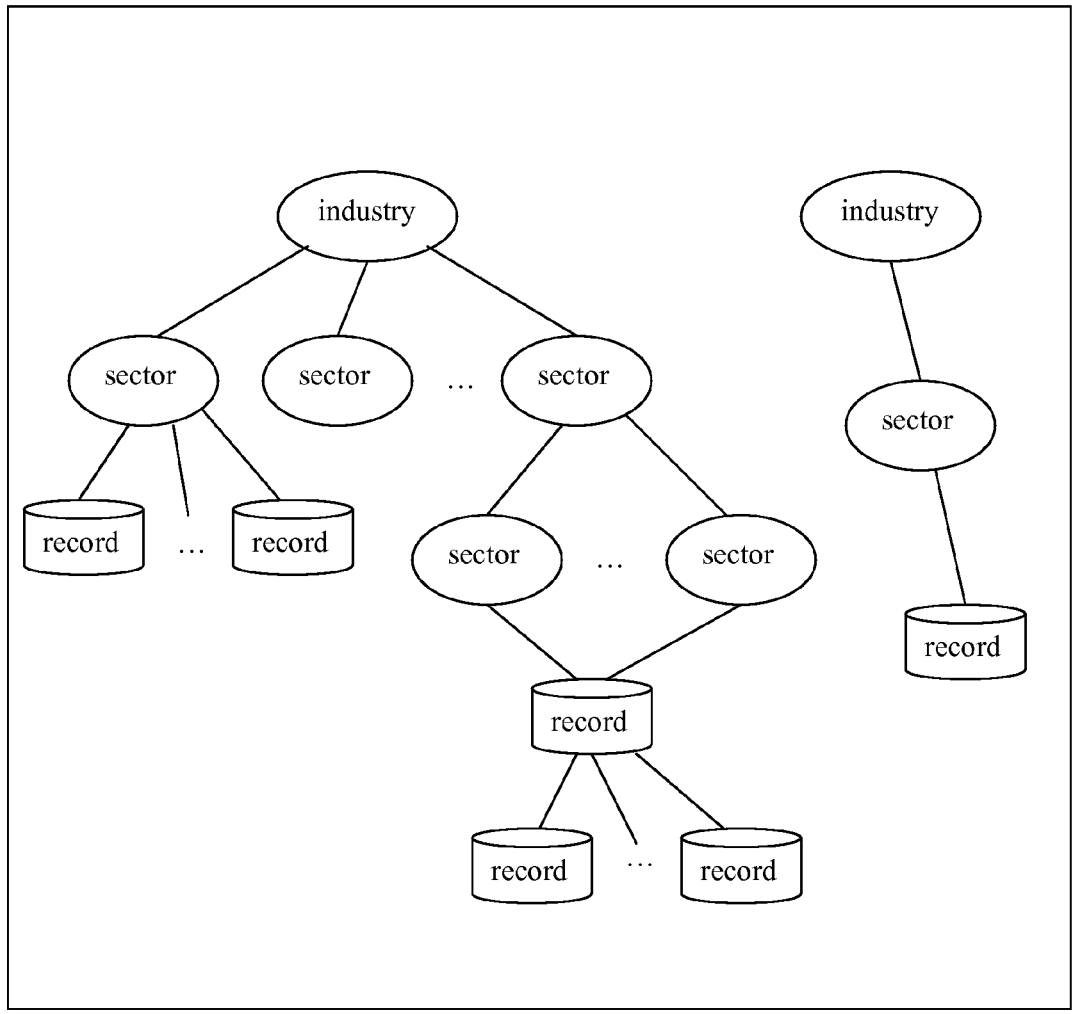
FIG. 9 is a schematic depicting relationships among records on the system, and industries and sectors.

FIG. 9 depicts one embodiment with which records on the system are arranged. A record belongs to at least one industry and one sector. A record might belong to another record.

Some of the records on the system correspond to entities. An entity typically is an actor in providing products and services, such as service providers, sellers of goods, wholesalers, manufacturers, consultants, agents, among others. Many times such entities are what a searcher is looking for in search results. Some of the records correspond to products; and others to services.

Various sources of records are contemplated, including (1) the Web, which is the main source for search engines Google-.com™ and others; (2) forms filled out by sellers, a source for eBay.com™; (3) formed filled out by businesses, a source for Business.com™; (4) product catalogues of certain classes of products, a source for Alibaba.com™ and GlobalSpec-.com™; (5) product price information filled out by sellers, a source for NexTag™, Expedia.com™; (6) business information gathered by humans, a source for SuperPages.com™; (7) catalogues of values of home at different addresses, a source for Zillow.com™.

Records are processed so that a record is associated with at least one industry and one sector; further, a record is parameterized and normalized, typically expressed in hierarchical pairs of (attribute, value). Attributes can further be iteratively and hierarchically grouped, resulting in a multi-dimensional structure that is preferably expressed as a tree. The resultant dataset in structure is reminiscent of product catalogues, and yellow pages.

In associating industry sectors to records, all suitable algorithms are considered, including text mining, classifications, clustering, Bayesian networks.

Prior art in this regard is considered. U.S. Pat. No. 6,546, 386, Black, et al., Apr. 8, 2003 teaches "conducting a statistical frequency analysis of the word occurrence in the document to determine the subject matter of the document", and "the subject matter being the most frequently occurring proper name or non-stopword".

U.S. Patent Application, 20050120006 A1, Nye, Timothy G., Jun. 2, 2005, teaches that "each entity is stored according to a classification scheme that includes one or more predefined classifications", further, a method that "uses a predefined humanly classified control group (yellow page headings, SIC codes) to organize the clusters, yet also allows the control group to grow if a large group of results form a cluster but this cluster does not fit into any specific predefined category."

Peng and Choi, "Automatic Web Page Classification in a Dynamic and Hierarchical Way", ICDM, 2002, teaches a "dynamic expanding" "hierarchical classification technique" that assigns a web page to a category.

With one embodiment, data gathered from various sources are first associated with entities such as companies, so that all information regarding an entity is aggregated. A record corresponds to an entity, a product, a service, etc., is recognized to belong to at least one industry sector.

Records are further parameterized and normalized, using methods not unlike the parameterization and normalization involved in deriving the second query as discussed above. Parameterization further applies keyword lists to extract information piece by piece from data associated with a record, and each piece of information is used in associating a value for an attribute. Parameterization consists of contemplated steps including: (1) recognizing data such as web pages that are most likely contain useful information, such as services, contact information, etc. by examining a URL string, anchor text and hyper links; (2) for each paragraph on a page, recognizing to an extent the service or product that it might be describing, by applying a list of best descriptors (e.g., keywords and phrases with certain positive or negative weights); (3) associating each paragraph with at least one industry sector; and (4) associating the entire record with at least one industry sector.

The second query 155 is provided with the search subsystem 240 to match against Records 235, and matched records are ranked. When a record is matched against the second query, the industry sector information is an important factor. All suitable algorithms are contemplated, including but not limited to (1) matching longest chains, e.g., a chain composed of industries and sectors; (2) exact matching with proximity search; (3) matching on normalization; (4) stemming; (5) tree algorithms; and (6) graph algorithms.

Matching between the second query and a record is necessarily multi-dimensional. In Information Retrieval, proximity search has been known to perform on one-dimension, and is a key enabler of current web technology. A preferred embodiment of this invention performs proximity search on multi-dimensions. Non-exact matching comprises matching across abstraction levels on a hierarchy of industry and sectors, for example, "colleges in Los Angeles" could match records for colleges in Los Angeles, and colleges in Southern California, and even colleges in California.

Thus, specific embodiments and applications of entity search and related improvements have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of searching for records, comprising:
receiving a first query from a user;
deriving an industry sector from the first query;
using sector information to determine additional information to be used in deriving a second query, wherein the additional information is other than a hierarchical classification;
requesting the additional information from the user; and
deriving the second query from at least a portion of the first query and at least a portion of the additional information wherein the second query includes at least one section parameterized by an (attribute, value) pair used to direct at least two of the following actions: searching, breaking a tie in ranking results, describing relationships among sections of the second query, and expressing confidence measures.

2. The method of claim 1, wherein individual ones of the records correspond to business entities.

3. The method of claim 2, wherein at least some of the entities are selected from the group consisting of service providers, sellers of goods, wholesalers, manufacturers, consultants, and agents.

4. The method of claim 1 wherein the first query is composed in natural language.

5. The method of claim 1, wherein the step of deriving an industry sector comprises using terms that are both associatively related and definitionally related.

6. The method of claim 1, further comprising deriving a second industry sector from the first query.

7. The method of claim 6, wherein the first sector comprises electronics, and the second sector comprises digital cameras.

8. The method of claim 1, wherein the step of deriving an industry sector from the first query is partially implemented with a tree structure.

9. The method of claim 1, wherein the step of deriving an industry sector from the first query is partially implemented with a graph structure.

10. The method of claim 1, wherein at least some of the additional information is information that would be deemed relevant by an expert in an industry that includes the industry sector.

11. The method of claim 1, wherein at least some of the additional information is information that would be deemed relevant by an expert in the industry sector.

12. The method of claim 1, further comprising deriving a third query from at least a portion of the first query and at least a portion of the additional information.

13. The method of claim 1, wherein the industry sector comprises sale of consumer goods.

14. The method of claim 1, wherein the industry sector is a portion of an industry that does not comprise sale of consumer goods, and the industry is selected from the group consisting of health care, travel, real estate, restaurant-going, entertainment, logistics, and sourcing.

15. The method of claim 1, wherein at least one of the records corresponds to a physical product.

16. The method of claim 1, wherein at least one of the records is not based on an Internet web page.

17. The method of claim 1, wherein at least one of the records corresponds to a service.

18. The method of claim 1 further comprising associating at least one of the records with first and second sectors of an industry that are distinct from the industry sector.

19. The method of claim 1, wherein the additional information comprises a perspective of the user.

20. The method of claim 19, wherein the perspective is selected from the list consisting of purchasing, shopping, procurement, bartering, requesting for quotes.

* * * * *

UNITED STATES PATENT AND TRADEMARK OFFICE
CERTIFICATE OF CORRECTION

PATENT NO. : 7,483,894 B2  Page 1 of 1
APPLICATION NO. : 11/751802
DATED : January 27, 2009
INVENTOR(S) : Yu Cao It is certified that error appears in the above-identified patent and that said Letters Patent is hereby corrected as shown below:

On title page, item 73 Assignee,
replace "Platformation Technologies, Inc."
with "Platformation, Inc.."

Signed and Sealed this

Twenty-fifth Day of August, 2009

David J. Kappos
*Director of the United States Patent and Trademark Office*